(12) United States Patent
Huntsman et al.

(10) Patent No.: US 6,620,236 B2
(45) Date of Patent: Sep. 16, 2003

(54) MATERIAL, AND METHOD OF PRODUCING IT, FOR IMMOBILIZING HEAVY METALS LATER ENTRAINED THEREIN

(75) Inventors: Brent E. Huntsman, Xenia, OH (US); Joe G. Tom, Vicksburg, MS (US); Charles A. Weiss, Jr., Clinton, MS (US); Philip G. Malone, Vicksburg, MS (US); Brad L. Huntsman, Dayton, OH (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/067,909

(22) Filed: Feb. 8, 2002

(65) Prior Publication Data

US 2003/0150360 A1 Aug. 14, 2003

(51) Int. Cl.$^7$ ................................................ C04B 7/02
(52) U.S. Cl. ...................... 106/713; 106/690; 106/691; 106/738; 588/257
(58) Field of Search ......................... 588/257; 106/690, 106/691, 713, 738

(56) References Cited

U.S. PATENT DOCUMENTS

| 5,202,033 | A | | 4/1993 | Stanforth et al. | |
|---|---|---|---|---|---|
| 5,637,355 | A | | 6/1997 | Stanforth et al. | |
| 5,719,099 | A | * | 2/1998 | Bhat | ........................... 502/414 |
| 6,264,735 | B1 | * | 7/2001 | Bean et al. | ................. 106/672 |

* cited by examiner

Primary Examiner—Paul Marcantoni
(74) Attorney, Agent, or Firm—Earl H. Baugher, Jr.

(57) ABSTRACT

Provided are structural material for bullet traps and the like, a method of producing it, and a structure comprising it. The material is suitable for entraining and immobilizing projectiles and fine particles in a sticky gel. It is prepared by mixing cement with a thickener to form a dry mixture. Water is mixed with a fine aggregate in a mixer. The dry mixture is combined with the aqueous mixture in the mixer to form a slurry. Calcium phosphate and an alumina compound are added, mixing each separately until homogeneous. The density of the mixture is measured and an aqueous foam is added to adjust the density to a pre-specified level. Fibers are mixed into the adjusted mixture to form a homogeneous slurry that may be poured into a mold or in place at a construction site. Upon curing, the material may be used as a structural component.

28 Claims, No Drawings

MATERIAL, AND METHOD OF PRODUCING IT, FOR IMMOBILIZING HEAVY METALS LATER ENTRAINED THEREIN

STATEMENT REGARDING FEDERALLY SPONSORED RESEARCH OR DEVELOPMENT

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Phillip Stewart at 601 634-4113.

FIELD OF THE INVENTION

The field relates to structural material that immobilizes heavy metals impacting thereon, thus providing a safe environment for personnel in the area while preventing subsequent environmental degradation. More particularly, provided in one embodiment is a fiber reinforced foamed-concrete structure that includes constituents, including aluminum, that significantly reduce the mobility of heavy metals, including fine particles thereof, when the structure is subjected to various forms of erosion, including that from acidic aqueous solutions.

BACKGROUND

In order to train military personnel, live-fire training villages have been employed in training exercises. During these exercises, projectiles are entrained in the walls (panels) simulating the buildings. Projectile-absorbing materials, such as rubber blocks or rubber-lined wooden boxes filled with quartz sand, provide only for absorbing the projectiles, i.e., they are single purpose materials. For example, they do not have the ability to control erosion of the projectile material, e.g., through boosting the alkalinity of water that may contact the spent projectiles. Unless they are collected shortly after dispensing, heavy metals; (to include all such heavy metals defined by the Environmental Protection Agency (EPA) as being harmful to the environment) entrained in these structures corrode and hazardous material is released. Particular heavy metals of interest include lead, arsenic (III), barium, bismuth, cadmium, chromium (II), copper, iron, nickel, selenium, and zinc.

Hazardous wastes containing excessive amounts of leachable heavy metals are banned from land disposal. For example, the current regulatory threshold limit for lead under the Resource Conservation and Recovery Act (RCRA) is 5 mg/l as measured by the Toxic Characteristic Leaching Procedure (TCLP), United States Environmental Protection Agency (USEPA) method 1311 (SW-846). The test is aimed at identifying the tendency of wastes to generate a leachate with concentrations of contaminants greater than the values listed at Volume 40, Code of Federal Regulations, Part 261.24, page 406, revised Jul. 1, 1988. Waste materials containing TCLP lead levels in excess of 5 mg/l are defined as lead-toxic hazardous waste and restricted from landfilling under current regulations. The cost of disposing lead toxic hazardous waste materials is in excess of $200.00 per ton plus the cost of transportation to the distant sites.

Patents dealing with the addition of phosphates to wastes or contaminated soils to reduce the solubility of lead and its compounds include U.S. Pat. No. 5,202,033, In Situ Method for Decreasing Heavy Metal Leaching from Soil or Waste, issued to Stanforth et al., Apr. 13, 1993 that describes a method of adding a combination of additives and buffering agents such as phosphates, carbonates, and sulfates. Other patents, such as U.S. Pat. No. 5,637, 355, Method of Nonhazardous Removal of Paint Containing Heavy Metals and Coating Preparation for Performing the Same, issued to Stanforth et al., Jun. 10, 1997 detail methods for applying a coating of phosphates and sulfides over a lead-based paint to make it insoluble for subsequent safe removal of the paint from a structure.

Because there is significant concern over the release of heavy metals into the environment, structure components have been developed which inhibit mobility of the heavy metals, preventing their leaching outside the components. Recently a foamed, fiber-reinforced concrete with selected additives has been used to fabricate these structures and reduce mobility of the heavy metals entrained therein. See U.S. Pat. No. 6,264,735 B1, Low-Lead Leaching Foamed Concrete Bullet Barrier, issued to Bean et al., Jul. 24, 2001 (hereafter the '735 patent), and incorporated herein by reference. This type of concrete has been particularly successful in structural panels for live-fire training villages, enclosures used for grenade training, and backstops on firing ranges. Foamed-concrete is the best type of heavy metal projectile-trapping material because it does not burn like wood or rubber, or rot, like wood, and does not erode like sand or soil. Chunks of heavy metals are more firmly entrained in this material than in wood or rubber. Finally, it is alkaline and thus suited to resist erosion caused by naturally occurring aqueous acidic flows.

When projectiles formed of heavy metals impact foamed concrete structures, the projectiles and their fragments are entrained therein. Any moisture in the concrete structure can initiate a chemical reaction on the surface of the heavy metals, causing corrosion and, eventually, erosion, or leaching, of the surface material. With the addition of water, the alkalinity of even the modified foamed-concrete decreases somewhat and the pH of the water in contact with the bullet fragments may be lowered enough to cause the heavy metals and their corrosion products to dissolve. Additionally, fine heavy metal particles may be entrained in concrete fragments that spall off the structures, falling to the ground. In a moist environment, the heavy metal fragments in these distributed spalled materials are subject to corrosion and dissolution, with subsequent leaching into the environment. In some scenarios, it may be severe enough to curtail training on firing ranges. Thus, there is a need in the art for an improved structure that robustly prevents mobility of heavy metals entrained in it, thus significantly reducing or eliminating the risk of soil and groundwater contamination.

SUMMARY

Advantages of a preferred embodiment of the present invention include:

dense projectiles will not rebound or ricochet from it;
structures constructed of it are insect proof;
low maintenance;
reduces the occurrence of dust having heavy metals entrained therein;
heavy metals later entrained in it chemically react with the material and any moisture that may contact the material or the heavy metal, immobilizing it;
safe, inexpensive, common construction materials are used as components;
only standard construction skills are needed to fabricate;
at the end of its useful life, the material may be deposited in a standard landfill; and the material is non-flammable when impacted by tracer or incendiary projectiles.

These advantages are realized in a preferred embodiment of the present invention envisioned in a structural component made from Portland cement-based, foamed, fiber-reinforced concrete that uses crushed limestone as the fine aggregate component to act as a buffer and contains materials, such as calcium phosphate and an aluminum compound, that react with heavy metals to produce a passivating (mobility degrading) coating on the heavy metals. Further, the coating establishes a sticky gel coating that also entrains any fine particles that may have spalled from the heavy metal or metal "smeared" on fine particles of the material that may have spalled from the material's surface.

When stabilizing entrained small arms bullets comprising a lead core and a copper jacket, adding aluminum to the material described in the '735 patent facilitates formation of complex lead and copper aluminum phosphate compounds within the structure that are less reactive and less soluble than the lead or copper phosphates and carbonates produced by the formulation of the '735 patent. One compound that forms is hydrated aluminum hydroxyphosphate, $PbAl_3(PO_4)_2(OH)_5$ monohydrate. As it naturally occurs, this mineral is plumbogummite. This and related lead phosphates (pyromorphites) have such low solubility that water samples taken from roadside soils that contain aluminum-rich clays that are contaminated from recent past use of leaded fuels typically contain less than 1 ppm of lead.

Also provided is a method of producing, foamed, fiber-reinforced concrete for forming structures that later entrain projectiles formed of heavy metals and essentially restrict mobility of these heavy metals, in all forms, to the structure itself. The method provides for dry mixing Portland cement with a suspending agent, such as a methylcellulose compound, to form a dry mixture. Water is mixed with a fine aggregate to form an aqueous mixture. The dry mixture of cement and suspending agent is mixed into the aqueous mixture to form a slurry. Powdered calcium phosphate and an aluminum compound are mixed into the slurry. Mixing is continued until all constituents are thoroughly distributed throughout the resulting mixture. The density of the resulting mixture is determined by removing a known volume of the mixture and determining its mass. A pre-formed, water-based foam is added to the resulting mixture until the density of the resulting mixture is adjusted to meet a pre-specified design density. Pre-specified fibers are mixed in after the density has been adjusted. Mixing is continued until the fibers are distributed evenly throughout. The final mixture is placed into molds of desired structural configuration and allowed to harden and moist cure. One configuration envisions panels or blocks to be employed singly or in built-up structures as a bullet trap that traps all or most bullets impacting it and that minimizes the chance of ricocheting bullets and release of heavy metals from the structure.

Uses of construction materials produced from a preferred embodiment of the present invention include: bullet traps and shoot houses for live-fire training; facing for berms at small-arms ranges; table tops for soldering operations using lead solder; blocks for lining trenches in training exercise areas; and use in 3D targets or manikins with a thin paper-mâché like composition having one or more layers with a coating of a material made from a preferred embodiment of the present invention.

DETAILED DESCRIPTION

In a preferred embodiment of the present invention, pre-specified amounts of additives are mixed with a cementitious construction material to significantly reduce or eliminate the erosion and subsequent mobility of heavy metal particles that become entrained in a structure built from the material. Specifically, calcium carbonate, calcium phosphate, and an aluminum compound are added in pre-specified amounts to a slurry of the material prior to curing it in its final structural configuration. Foamed, fiber-reinforced concrete that contains small amounts of calcium carbonate, calcium phosphate, and an aluminum compound do not interfere with the stability of added foam in the slurry nor retard the cure rate.

The present invention uses the slow dissolution of calcium phosphate compounds with the addition of an aluminum compound, and the inherent alkalinity of the slurry with the calcium carbonate (limestone) aggregate to accomplish this. A preferred embodiment of the resultant construction material is prepared using proportions shown in Table 1.

For desirable insoluble compounds, such as hydrated lead aluminum hydroxyphosphate to form the stoichiometry of the mixture of a preferred embodiment requires that the amount of aluminum by mass must be at least 1.3 times the mass of phosphorous present in the mix. Since the formation of lead and copper phosphate coatings, for example, is a phenomenon that occurs on the surface of grains of metal, the minimum amount of phosphorous that must be present to make a stabilizing (non-leaching) mixture depends on the number and grain size of the metal particles. Typically, phosphorous has been added in the form of tribasic calcium phosphate in an amount that is approximately 10% of that of the mass of the Portland cement. Tribasic calcium phosphate contains 20% by mass phosphorous. Thus phosphorous is present in the dry mix of cement and phosphate additive in the amount of 2% by mass of the Portland cement. Thus, if aluminum is to be added at a minimum of 1.3 times the mass of phosphorous, then aluminum at 0.087 parts (a ratio of 1.73:1 of Al:P) as given in Table 1 insures sufficient aluminum to meet the stoichiometry requirement.

TABLE 1

PROPORTIONING OF FOAMED FIBER-REINFORCED CONCRETE CONTAINING PHOSPHATE AND ALUMINUM

| Component | Parts by Mass of Cement |
| --- | --- |
| Portland cement ASTM C 150 Type I-II | 1 |
| Fine aggregate (ASTM C 33) crushed limestone | 1.0 |
| Water (potable) | 0.4 |
| Thickener or thickening agent (Dow Methocel, K-100M), Dow Chemical Co., Midland, MI | 0.001 |
| Tribasic calcium phosphate (CAS No. 1306-06-5) | 0.05 |
| Aluminum Hydroxide from gel (EM Industries, Darmstadt, DE) | 0.087 |
| Aqueous based foam (Cellufoam Systems, Inc., Scarsbourgh, Ontario, Canada) | Volume necessary to adjust density |
| Fiber, synthetic organic polypropylene (Fiber-Lok, Inc., Keller, TX) | 0.02 by volume of final slurry (or as needed to resist cracking) |

The cement is Portland ASTM C 150 cement, Type I-III, and the thickening agent or thickener is Dow METHOCEL K-100 M, made by Dow Chemical Company in Midland, Mich. Up to 3% of the cement by mass can be replaced with silica fume. The cement and thickening agent are dry mixed in a separate container. The full amount of water to be used is placed in the mixer. The fine aggregate is then added to the water. In a preferred embodiment, the fine aggregate is crushed limestone meeting the ASTM C 33 grading criteria.

After wet mixing is initiated, the dry mix of Portland cement and thickener are added to the mixer. Next, the calcium phosphate and aluminum compounds are added, each separately with mixing continued until each constituent is distributed evenly throughout before the next one is added. The density of the resultant slurry is determined by removing a known volume and determining the mass. A pre-specified amount of aqueous foam is added to adjust the density of the slurry to the pre-specified level. For example, military small-arms ranges use densities from 70 lb/ft$^3$ on pistol ranges to 90 lb/ft$^3$ on rifle ranges. After adjusting the density of the slurry, a fiber is added. The fiber may be a natural cellulose fiber, a synthetic fiber, a steel fiber, or combinations thereof. Mixing continues until the fiber is distributed evenly throughout. The fiber is added at amounts that are nominally 2% by volume of the final slurry. The slurry is allowed to moist cure then de-molded and put into service. A typical building component "bullet trap" is made by standing panels poured from the material or by stacking pre-formed blocks of the material.

Test batches comprised the phosphate-aluminum-rich, limestone-aggregate material without the foam and fiber but with the addition of technical-grade lead powder at a rate of 1.23% by mass of lead to the mass of this formulation. Leach tests conducted using the EPA's TCLP Test Method 1311 demonstrated that the material leached significantly less lead than the same formulation with sand aggregate and no phosphate and aluminum additive and appreciably less lead than a material using only phosphate additives. With carbonate, phosphate, and aluminum present, the concentration of lead in the leachate was less than 8.0 ppb. With carbonate and phosphate only present, the concentration of lead in the leachate was 0.17 ppm. Without the carbonate and phosphate added, the concentration of the lead in the leachate was 0.87 ppm.

A further comparison of the immobilizing product of the '735 patent to that of a preferred embodiment of the present invention involves solubility product constants. The value for the constant of lead phosphate (hydroxypyromorphite) produced by reaction with the cured product from the '735 patent is $10^{-76.8}$ whereas the constant for lead aluminum phosphate hydrate (plumbogummite) formed by a reaction with the cured product of a preferred embodiment of the present invention is $10^{-99.3}$, a difference of over 20 orders of magnitude.

Additionally, a sticky aluminum hydroxide gel forms when aluminum is converted by a reaction to the alkalinity of the Portland cement. This gel reduces the chance that fine lead particles, with a density of 11.36 g/cc, will separate from the cured product, with a density of 3.15 g/cc in any separating occurrence. Thus any chance of heavy metal entrained in dust from spalling is reduced.

Aluminum may be provided as one of a variety of compounds, although in metallic form it is the least useful. Metallic aluminum reacts with the calcium hydroxide generated by the hydrating Portland cement to produce hydrogen gas. The bubbles of hydrogen gas reduce the density of the slurry below that which even the addition of foam had produced. Further, metallic aluminum powder is difficult to mix uniformly into the slurry.

Added as a nitrate, sulfate, or chloride, an aluminum compound is quickly converted to aluminum hydroxide. Any aluminum salt may be used also, but addition of aluminum as a hydroxide avoids introduction of anions that may be detrimental to the structural integrity of the final slurry. Any compound in which aluminum is present in the form of the aluminate anion may be used also. However, in some of these aluminates, cations can cause unwanted responses especially with the alkali metals (sodium, potassium and lithium) that react with the calcium hydroxide to raise the pH of the final slurry.

Aluminum-rich zeolites, such as heulandite or chabazite, or treated clays, such as metakaolinite, may be used. They have the additional advantage of providing added silica that may contribute to the bonding properties of the final slurry. Further, any zeolites that are not required for the reaction act as heavy metal scavengers in the cured product, thus immobilizing lead present in water flowing over the cured product.

Finally, "clean" waste sludges, such as those resulting from "alum-based" water purification systems may be used as an aluminum source. Typically, these comprise an aluminum hydroxide gel with a small amount of entrained clay. Given few, if any, additional impurities in these waste sludges, they may be recycled by adding to the slurry, providing the required amount of aluminum for the heavy metal-aluminum phosphate reaction. Other industrial wastes that contain aluminum, such as a slag from bauxite refining, may be suitable for this purpose also.

The carbonate aggregate can be added at a mass up to that equal to the mass of the cement (or cement plus silica fume, if used), i.e., one part. Preferably, the carbonate aggregate is sand-sized, graded, crushed limestone meeting the grading specification in ASTM C33. The phosphate compound can be selected from the group comprising calcium monobasic phosphate, calcium dibasic phosphate, and calcium tribasic phosphate, (or a combination of the group) up to 5% of the mass of the cement, i.e., 0.05 part.

Experience with the additive suggests that the decrease in solubility of the heavy metals (in the test case, lead) is related to the formation of a surface coating on the heavy metal particles. For example, the amount of phosphate added does not have to be related to the mass of the heavy metal that may be entrained in the bullet trap, but to the amount of exposed heavy metal that might require coating to inhibit its mobility. The only limitation on the amount of phosphate added is that the amount of water needed increases as the amount of fine-granulated material increases. Generally, adding water above that normally used to enable coating each particle of a standard cementitious mix lowers its cured strength.

The addition of calcium carbonate, aluminum and calcium phosphate to the cement establishes a coating on the entrained heavy metals that retards erosion of the heavy metals. In the example of lead, the coating is a lead phosphate or complex lead phosphate-carbonate.

The calcium carbonate, aluminum and calcium phosphate additives interact with acidic rainwater or groundwater to raise the pH of the aqueous solution contacting the heavy metals, thus inhibiting corrosion and erosion of the surface of the heavy metals. Heavy metals are more soluble in acidic water than alkaline in the normal pH range in which rainwater or groundwater occurs. The improved aluminum-phosphate-rich foamed concrete has all of the best characteristics of regular foamed-concrete and has better characteristics with regard to inhibiting mobility of entrained heavy metals. Any phosphate that does dissolve re-precipitates on the heavy metals as a metal-phosphate or metal-phosphate-carbonate that is tightly bound to the heavy metal and resists erosion.

A preferred embodiment of the present invention can be used in firing range back stops, protective berms in front of targets, or in blocks used to control erosion of firing ranges.

Additionally, a preferred embodiment of the present invention can be used to build mock villages for live-fire training.

We claim:

1. A method of producing a structural material that immobilizes heavy metals comprising:

providing about 1 part by mass of Portland cement and 0.001 part by mass of a stabilizer;

dry mixing said Portland cement and said stabilizer to form a dry mixture in a container;

adding about 0.4 part by mass of water to about 1 part by mass of crushed limestone in a mixer;

wherein said water is provided in an amount sufficient to form an aqueous mixture;

combining said dry mixture with said aqueous mixture in said mixer to form a first slurry;

adding about 0.05 part by mass of calcium phosphate to said first slurry to achieve a second slurry;

determining the density of said second slurry;

reducing the density of said second slurry by adding a aqueous foam to achieve a density of said structural material between about 70 and 90 lbs/ft$^3$, wherein said addition of aqueous foam forms a third slurry;

adding up to 2% by volume of a resultant final slurry of fiber to said third slurry until said fiber is distributed throughout in said final slurry, wherein said fiber prevents cracking of said structural material, placing said final slurry in a mold; and allow said final slurry to wet cure in said mold, wherein the improvement comprises:

adding an aluminum compound of at least 0.065 part by mass after the addition of said calcium phosphate and mixing thoroughly, wherein said aluminum compound facilitates the formation of a sticky gel on surfaces of said structural material in immediate contact with said heavy metals and further entrains fine particles that may contain said heavy metals, and wherein lead aluminum phosphate hydrate is formed as an insoluble compound containing lead entrained in said structural material.

2. The method of claim 1 further moist curing said final slurry in said mold.

3. The method of claim 1 further de-molding the resulting cured structural material, wherein said de-molded structural material may be employed as a structural component.

4. The method of claim 1 in which said fiber is selected from the group consisting of a synthetic fiber, a natural fiber, a steel fiber, and any combination thereof.

5. The method of claim 1 in which said crushed limestone comprises calcium carbonate.

6. The method of claim 1 in which said calcium phosphate is selected from the group consisting of calcium monobasic phosphate, calcium dibasic phosphate, calcium tribasic phosphate, and any combination thereof.

7. The method of claim 1 in which said water is potable water.

8. The method of claim 4 in which said fiber comprises about 0.02 part by volume of said final slurry.

9. The method of claim 8 in which said synthetic fiber is a polypropylene fiber.

10. A structural material processed in accordance with claim 1, comprising:

about 1 part by mass of Portland cement;

about 0.001 part by mass of a stabilizer, about 1 part by mass of crushed limestone;

about 0.4 part by mass of water, wherein said water is provided in an amount sufficient to form an aqueous mixture with said crushed limestone;

about 0.05 part by mass of calcium phosphate;

at least 0.065 part by mass of an aluminum compound;

an amount of aqueous foam necessary to achieve a density of said structural material between about 70 and 90 lbs/ft$^3$.

wherein said aqueous foam is added to reduce the density of a mixture of said Portland cement, said stabilizer, said water, said crushed limestone, said calcium phosphate and said aluminum compound; and fiber, in an amount up to 2% by volume of a resultant final slurry, wherein said fiber prevents cracking of said structural material;

wherein the improvement comprises:

adding said aluminum compound after the addition of said calcium phosphate;

wherein said structural material further immobilizes heavy metals entrained therein when compared to structural material that does not contain said aluminum compound, and wherein lead aluminum phosphate hydrate is formed as an insoluble compound containing lead entrained in said structural material.

11. The structural material of claim 10 in which said calcium phosphate is selected from the group consisting of calcium monobasic phosphate, calcium dibasic phosphate, calcium tribasic phosphate, and any combination thereof.

12. A heavy-metal-immobilizing structural material for use in a structural component, comprising:

about 1 part by mass Portland cement;

about 1 part by mass crushed limestone;

about 0.4 part by mass of;

an amount of aqueous foam sufficient to yield a density of said structural material between about 70 and 90 lbs/ft$^3$;

fiber in an amount un to about 2% by volume of said resultant structural material, wherein said fiber is added in an amount sufficient to aid in resisting cracking of said structural component, said fiber selected from the group consisting of a natural fiber, a synthetic fiber and a steel fiber; and about 0.05 part calcium phosphate by mass, wherein the improvement comprises:

the addition of about at least 0.065 part by mass of an aluminum compound, wherein said aluminum compound facilitates the formation of a sticky gel on surfaces of said structural component in immediate contact with said heavy metals and further entrains fine particles that may contain said heavy metals, and wherein lead aluminum phosphate hydrate is formed as an insoluble compound containing lead entrained in said structural material.

13. The structural material of claim 12 in which said calcium phosphate is selected from the group comprising of calcium monobasic phosphate, calcium dibasic phosphate, calcium tribasic phosphate, and any combination thereof.

14. A structural component, material for constructing said component processed in accordance with claim 1, said material comprising:

about 1 part by mass of Portland cement;

about 0.001 part by mass of a stabilizer;

about 1 part by mass of crushed limestone;

about 0.4 part by mass of water, wherein addition of said water to forms an aqueous mixture of said crushed limestone and said water;

about 0.05 part by mass of calcium phosphate;

at least 0.065 part by mass of an aluminum compound;

amount of aqueous foam necessary to reduce the density of said structural component to between about 70 and 90 lbs/ft$^3$; and fiber, in an amount up to 2% by volume of a resultant final slurry, wherein said fiber prevents cracking of said structural material;

wherein the improvement comprises:

adding said aluminum compound after the addition of said calcium phosphate;

wherein said improved structural component further immobilizes heavy metals entrained therein when compared to a structural component that does not contain said aluminum compound, and wherein lead aluminum phosphate hydrate is formed as an insoluble compound containing lead entrained in said structural component.

15. The method of claim 1 in which said alum m compound is selected from the group consisting of: metallic aluminum, aluminum salts, aluminum sulfates, aluminum nitrates, aluminum chlorides, aluminum-rich zeolites, waste sludges that contain aluminum, and compounds in which aluminum is present in the form of aluminate anions.

16. The material of claim 10 in which said aluminum compound is selected from the group consisting of: metallic aluminum, aluminum salts, aluminum sulfates, aluminum nitrates, aluminum chlorides, aluminum-rich zeolites, waste sludges that contain aluminum, and compounds in which aluminum is present in the form of aluminate anions.

17. The material of claim 12 in which said aluminum compound is selected from the group consisting of: metallic aluminum, aluminum salts, aluminum sulfates, aluminum nitrates, aluminum chlorides, aluminum-rich zeolites, waste sludges that contains aluminum, and compounds in which aluminum is present in the form of aluminate anions.

18. A structure, the components for constructing said structure comprising said material processed in accordance with claim 1, said material comprising:

about 1 part by mass of Portland cement;

about 0.001 part by mass of a stabilizer, about 1 part by mass of crushed limestone;

about 0.4 part by mass of water, wherein addition of said water forms an aqueous mixture of said crushed limestone and said water, about 0.05 part by mass of calcium phosphate;

at least 0.065 part by mass of an aluminum compound;

an amount of aqueous foam necessary to reduce the density of said structural component to between about 70 and 90 lbs/ft$^3$; and fiber, in an amount up to 2% by volume of a resultant final slurry, wherein said fiber prevents cracking of said structural material;

wherein the improvement comprises:

adding said aluminum compound air the addition of said calcium phosphate;

wherein said structure further immobilizes heavy metals ended therein when compared to a structure that does not contain said aluminum compound, and wherein lead aluminum phosphate hydrate is formed as an insoluble compound containing lead entrained in said structure.

19. The structural material of claim 10 in which said fiber is selected from the group consisting of a synthetic fiber, a natural fiber, a steel fiber, and any combination thereof.

20. The structural material of claim 10 in which said crushed limestone comprises calcium carbonate.

21. The structural material of claim 10 in which said water is potable water.

22. The structural material of claim 10 in which said fiber comprises about 0.02 parts by volume of said final slurry.

23. The structural material of claim 19 in which said synthetic fiber is a polypropylene fiber.

24. The heavy-metal-immobilizing structural material of claim 12 in which said fiber is selected from the group consisting of a synthetic fiber, a natural fiber, a steel fiber, and any combination thereof.

25. The heavy-metal-immobilizing structural material of claim 12 in which said crushed limestone comprises calcium carbonate.

26. The heavy-metal-immobilizing structural material of claim 12 in which said water is potable water.

27. The heavy-metal-immobilizing structural material of claim 12 in which said fiber comprises about 0.02 parts by volume of said final slurry.

28. The heavy-metal-immobilizing structural material of claim 24 in which said synthetic fiber is a polypropylene fiber.

* * * * *